JOHN HART WILSON
INVENTOR.

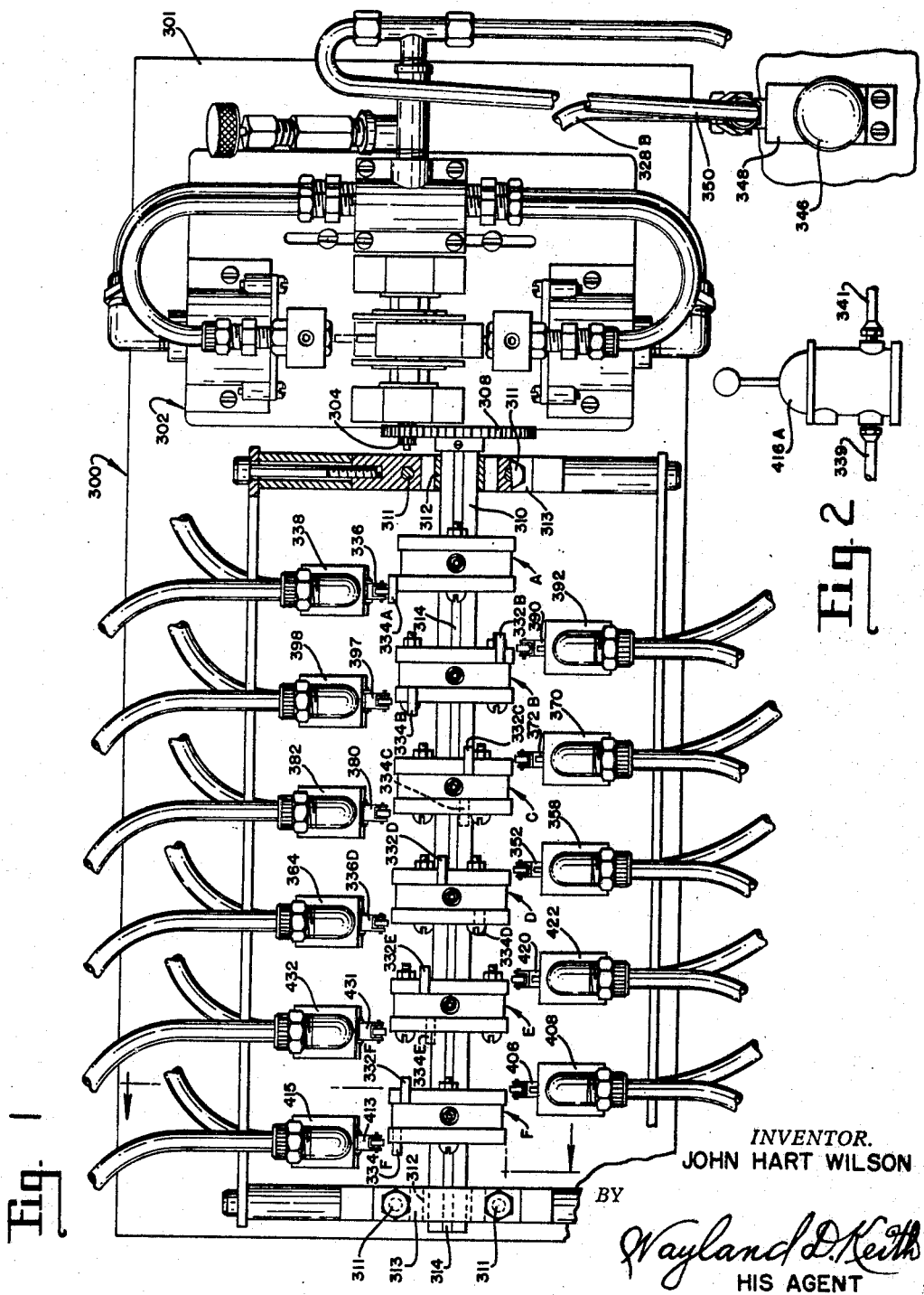

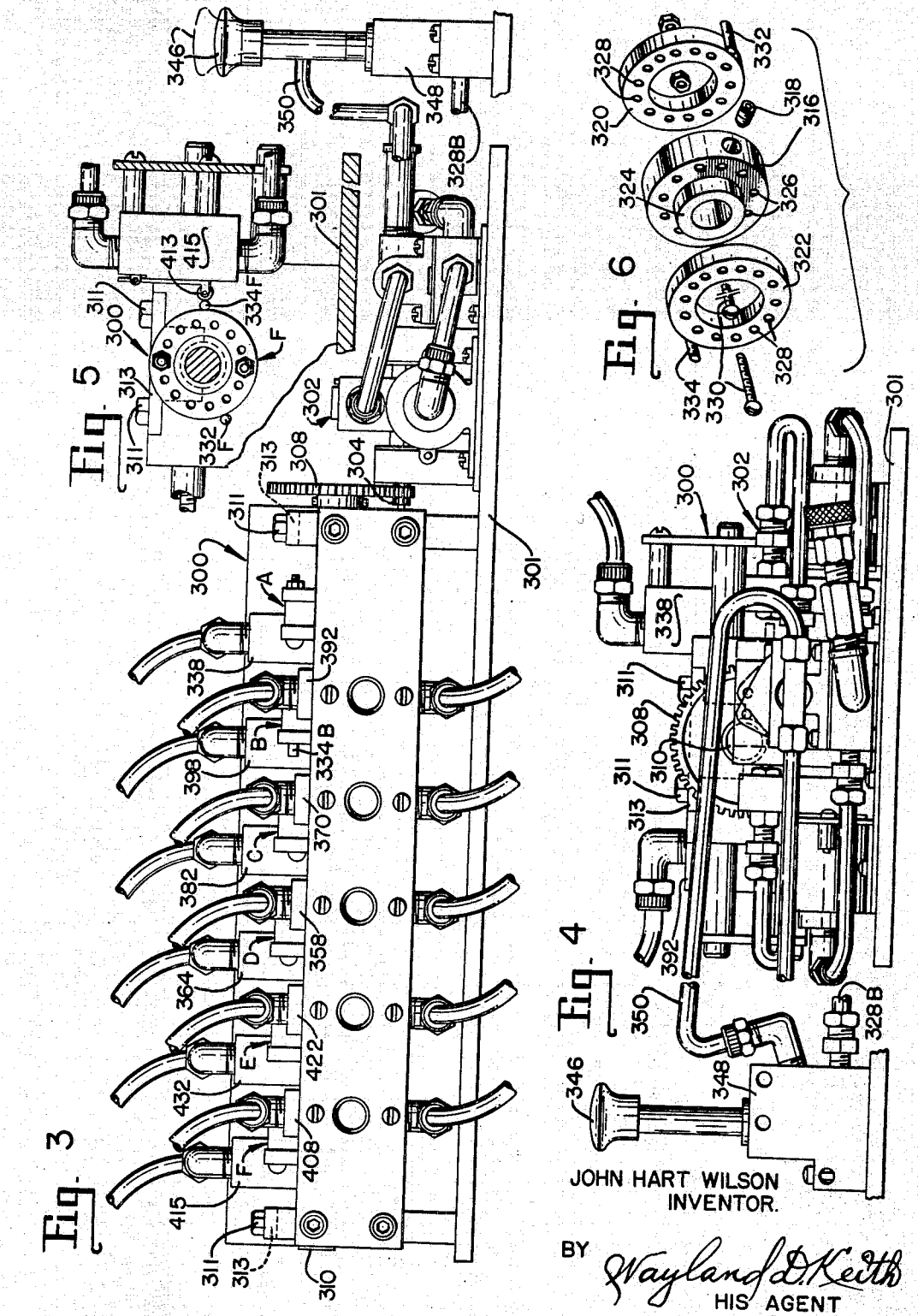

JOHN HART WILSON
INVENTOR.

BY
Wayland D Keith
HIS AGENT

March 17, 1970 J. H. WILSON 3,500,863
AUTOMATED PROGRAMMING DEVICE
Original Filed April 24, 1967 5 Sheets-Sheet 5

JOHN HART WILSON
INVENTOR.

BY
*Wayland D. Keith*
HIS AGENT

United States Patent Office 3,500,863
Patented Mar. 17, 1970

3,500,863
AUTOMATED PROGRAMMING DEVICE
John Hart Wilson, % Wilson Manufacturing Company,
P.O. Box 1031, Wichita Falls, Tex. 76307
Original application Apr. 24, 1967, Ser. No. 633,232.
Divided and this application Apr. 22, 1969, Ser. No. 818,343
Int. Cl. F17d 3/00; F16k 51/00
U.S. Cl. 137—624.17    9 Claims

ABSTRACT OF THE DISCLOSURE

An automated programming device for operating a plurality of elements in timed sequence over a period of time. The invention includes cam plates with one or more cams on each cam plate with an abutment rigidly and permanently secured on the cam plate, which cam plate may be adjusted with respect to a hub in Vernier relation by rigidly securing the cam plate or plates to the hub, with the number of circumferentially spaced holes in the cam plate or disc of a different number than the circumferentially spaced holes in the hub, so, when the hub and the cam plate or plates are matched together, only two holes in the cam plate will register with two holes in the hub, thereby to enable Vernier setting of the rigid cam with respect to the timing of the cam shaft. The cams may operate switches, pilot valves or the like. In the present instance pilot valves are shown as being operated in sequence to operate a supply valve to enable fluid under pressure to be supplied to a fluid actuated mechanism, such as a double acting fluid actuated cylinder, a motor, or the like.

CROSS REFERENCES TO RELATED APPLICATIONS

This application is a division of application Ser. No. 633,232, Automated Drill Stem and Pipe Positioner Device, filed Apr. 24, 1967, and co-pending therewith, which application Ser. No. 633,232 was a continuation-in-part of application Ser. No. 492,581, filed Oct. 4, 1965, for Drill Stem and Pipe Positioned Device, now Patent No 3,315,822, issued Apr. 25, 1967. The last mentioned application was co-pending with application Ser. No. 634,976 for Automated Pipe Tongs, filed May 1, 1967, which last mentioned application is co-pending with the present application.

BACKGROUND OF THE INVENTION

The present invention relates to a so-called programming device, which will cause the opening and closing of switches or valves upon rotation of a shaft which will cause the actuation of power elements remote therefrom, in a preprogrammed sequence.

It is desirable to provide an automated programming device which is as compact as possible, and which is, furthermore, reliable in operation and which requires a minimum of maintenance.

It is further desirable to have an automated programming device having cams thereon, which cams may be adjusted in minute, positive, Vernier relation with respect to a cam hub and secured in place against slippage to enable the programming device to be reprogrammed without the necessity of cutting especially shaped cams.

It is further desirable to have a substantially standard, circumferentially apertured cam hub with a plurality of apertures therein and to have a cam disc or plate attached thereto, which cam disc or plate has a plurality of circumferentially spaced holes formed therein of a different number, but with the same bolt centers as the circumferentially spaced apertures in the hub, so, by bolting the cam discs or plates to the hub, minute angular variations with respect to the shaft may be obtained to enable minute timing of the programming mechanism, yet securing the circumferentially apertured discs in rigid relation to the circumferentially apertured hub by bolts passing through holes therein.

It is also desirable to have a programming device whereby an entire programming cam assembly may be removed intact and set aside for future use, and another preprogrammed cam assembly installed, which will give an entirely different sequence of operation, thereby eliminating a recalibration of the cams each time a change is made in the programming.

It is further desirable to provide an automated programming device to operate a plurality of cams, which in turn, will operate pilot valves to sequentially operate control valves, which control valves direct fluid to the various fluid actuated cylinders or the like in proper timed sequence.

The problems heretofore in programming devices, which utilize cams, is that cams cut on a milling machine and which are rigidly keyed in one place to a shaft, are often utilized, which arrangement is not readily changed to a new programming sequence, unless new cams are cut. Other cam arrangements involve the use of clamp-on abutments, which after a few thousand actions, usually became loosened and did not hold the same programming sequence for which they were originally set. Still others had perforated discs with pins therein, which were not secured thereto, as by welding, which would permit loosening of the pins in due course of wear.

The present construction preferably involves identical cam discs with circumferentially spaced holes, with the bolt centers of the cam discs being the same as the bolt centers of the circumferentially spaced holes in the hub, with at least one outstanding pin or abutment rigidly and permanently secured to the periphery of the cam disc, as by welding and with the holes in the hub being of a different number from the holes in the cam discs, so as to give a Vernier adjustment of the cam elements with respect to the shaft on which the hub is mounted.

PRIOR ART

No. 2,426,779, MacDonald, Sept. 2, 1947, Cl. 277—60
No. 2,563,765, Wedeberg, Aug. 7, 1951, Cl. 184—7
No. 2,691,314, Stevens et al., Oct. 12, 1954, Cl. 81—52.4
No. 2,946,346, Mead, July 26, 1960, Cl. 137—622
No. 2,977,276, Colliva, Mar. 28, 1961, Cl. 162—118
No. 566,322, Reiss (British), Dec. 22, 1944

SUMMARY OF THE INVENTION

A programming device with a shaft rotatably mounted on a base in journaled relation. The shaft may have one or more cam hubs secured thereto, with each cam hub having one or more cam plates or discs therein, which are capable of Vernier adjustment, with the cam actuating switches or valves to actuate an element, either through pilot means or directly, in a sequential manner.

A plurality of operations may be carried on simultaneously or successively, and upon each revolution of the cam shaft these operations will be repeated. When it is necessary to have several programs for the same machine the cam shaft and the programmed cams thereon may be removed and replaced by a different preprogrammed cam shaft arrangement to perform an entirely different operation.

BRIEF DESCRIPTION OF THE DRAWINGS

FIG. 1 is a top plan view of the motor driven, cam actuated programming device, showing the cams and pilot operated control valves thereon, with parts broken away, with parts shown in section to bring out the details

Figure 7:
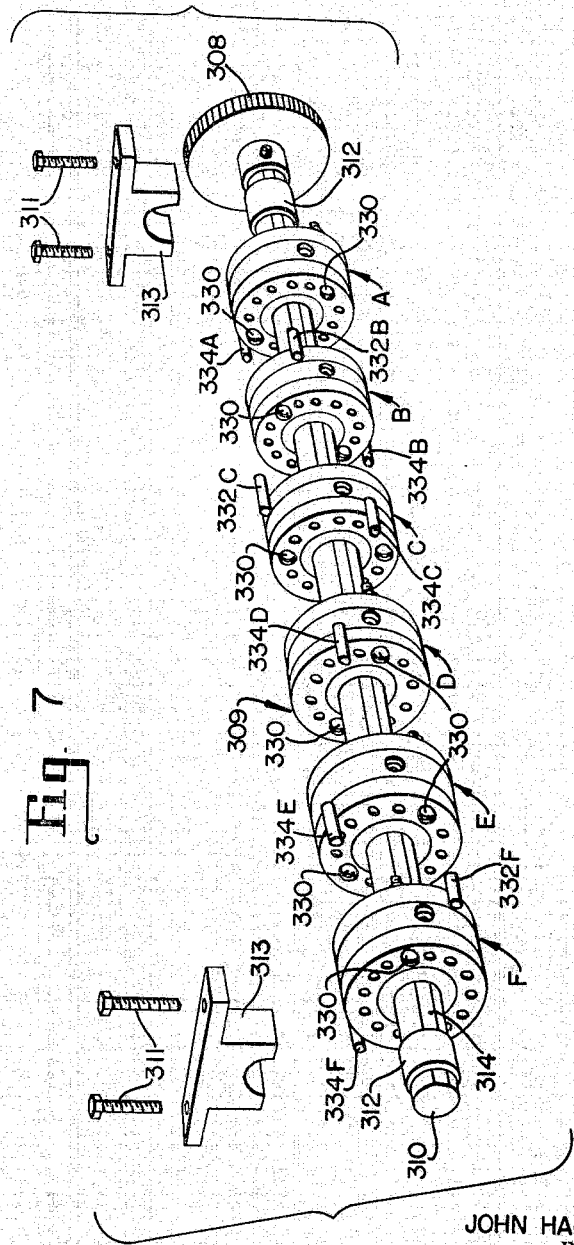
Figure 8:
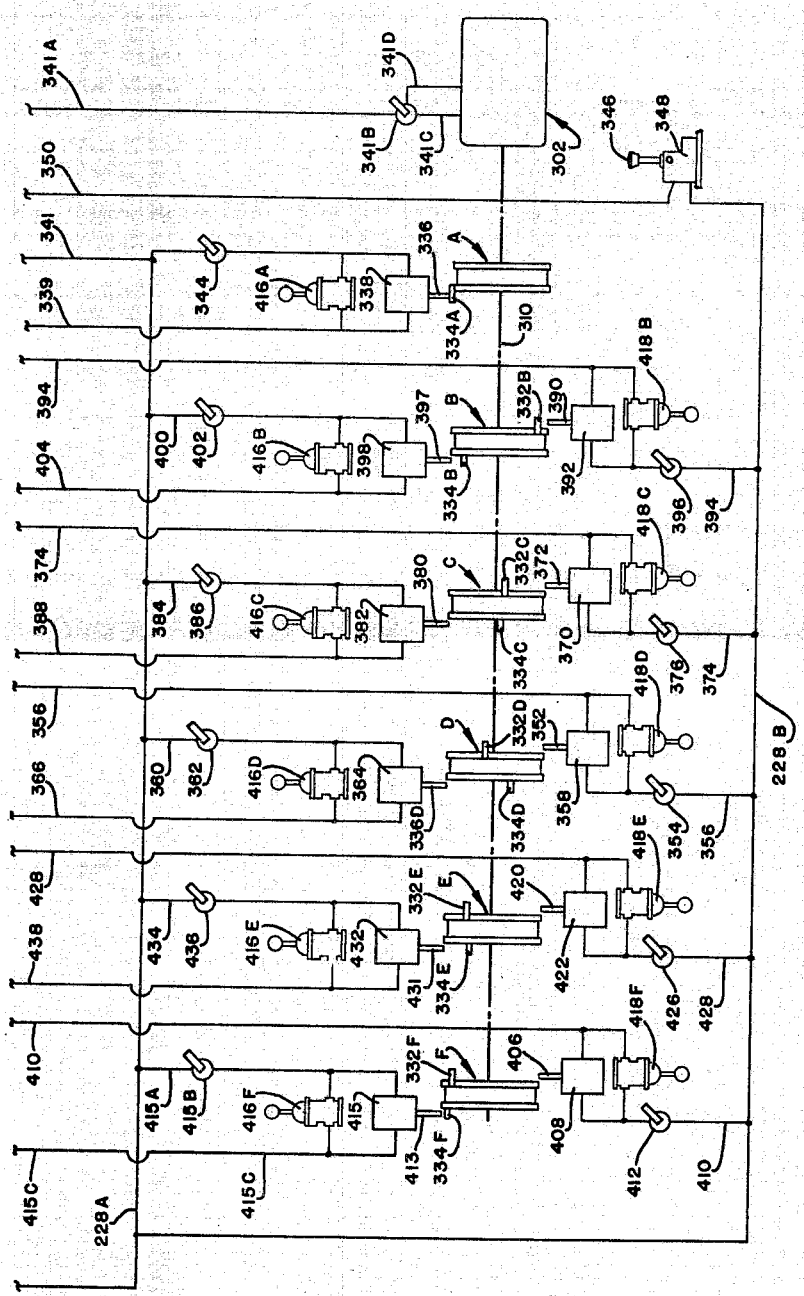
Figure 9:
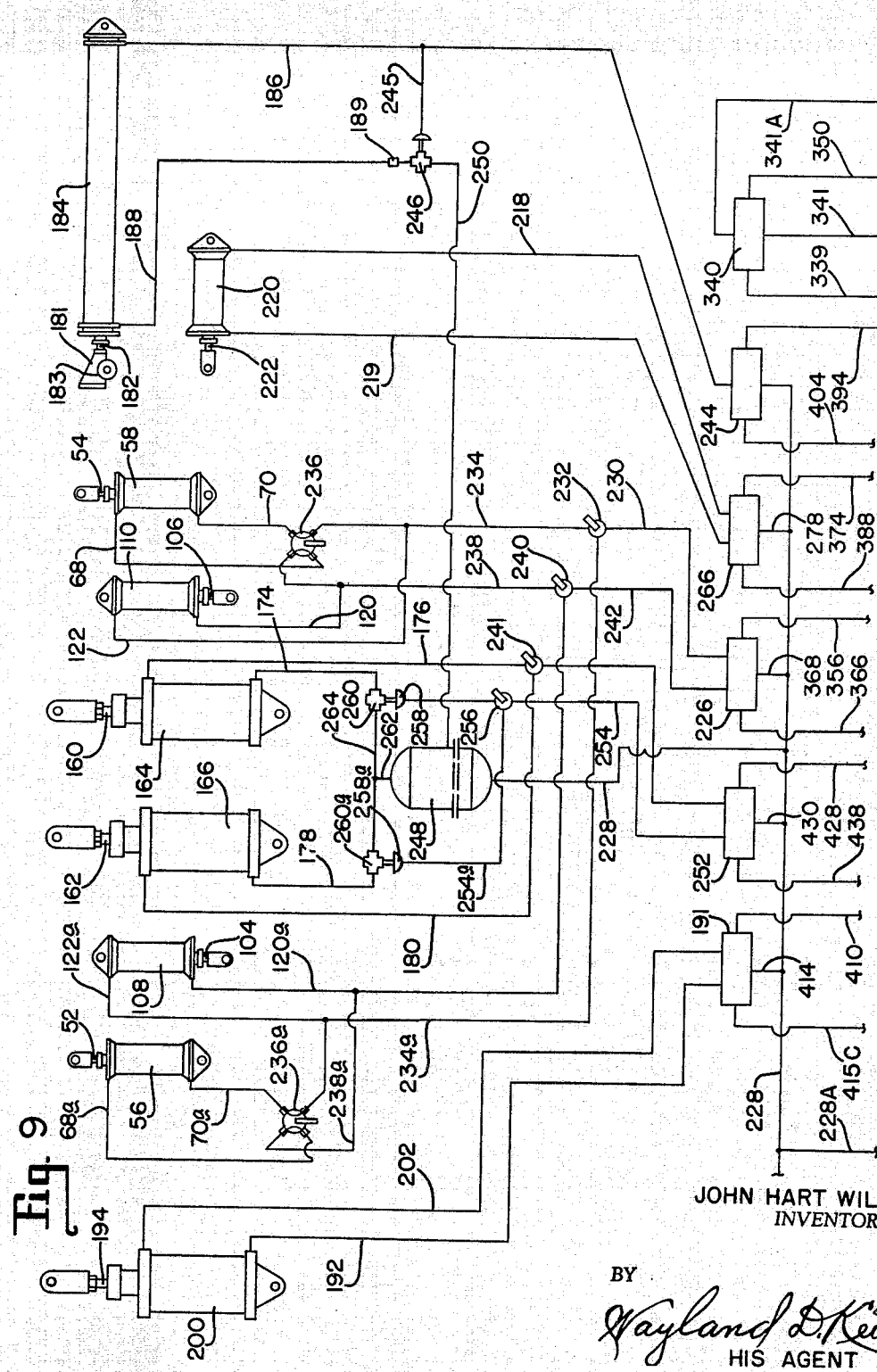

3 of construction, and showing a starting valve therefor;

FIG. 2 is a side elevational view of a three-way, manually controlled, off, on and bleed valve;

FIG. 3 is a side elevational view of the programming mechanism as shown in FIG. 1;

FIG. 4 is an end elevational view of the programming device as shown in FIGS. 1 and 3, showing a starting valve associated therewith;

FIG. 5 is a sectional view taken approximately along the line 5—5 of FIG. 1, looking in the direction indicated by the arrows;

FIG. 6 is an exploded, perspective view of a cam hub and a cam plate, with cams thereon, showing the associated parts in exploded relation with respect thereto;

FIG. 7 is a perspective view of a programmed cam shaft shown apart from the automated programmed mechanism, showing removable clamps and bolts in exploded relation thereto;

FIG. 8 is a diagrammatic view of the motor driven, cam actuated programming mechanism, with pilot control valves, including a starting and a stopping valve, which programming mechanism sequentially operates control valves to actuate fluid actuated mechanisms to operate machine elements on the programmed device; and FIG. 9 is a diagrammatic view showing the remotely controlled valves and the air lines leading thereto and to the fluid actuated mechanisms associated with the programming mechanism.

DESCRIPTION OF THE PREFERRED EMBODIMENT

A preferred embodiment of the programming device is shown in the accompanying drawings in which a motor driven, cam actuated programming device is designated generally at 300, which device is mounted on a base 301, with the motor being mounted thereon, which is designated at 302. The motor may be either electrically driven or air driven, in the present instance it is indicated as being an air driven motor, which motor mechanism includes the necessary air conduits and motor valves to bring about the proper operation of the motor. A drive pinion 304 is secured to the end of the motor shaft 306, which pinion is engaged in meshed relation with a gear 308 which is mounted on cam receiving shaft 310, which cam receiving shaft 310 is journaled in bearings 312 which bearings are held in place by quick removable caps 313, which caps are held in place by bolts 311. This enables a cam shaft 310 and the programmed assembly of cams thereon to be programmed for one operation, including step by step functions, which cam shaft and assembly of programmed cams can be quickly removed by removing the caps 313 and a like cam shaft 310, but with a different programming of cams thereon can be installed, to sequentially operate valves to enable the second cam shaft and cam assembly thereon to perform an entirely different set of functions, as for instance, the above functions in reverse, without having to adjust any of the cam elements thereon.

When the second cam shaft and the cam assembly thereon is fitted into place, with the gear 308 and the pinion 304 in meshed, driving relation, the caps 313 are bolted in place by bolts or cap screws 311. The shaft 310 is preferably flattened, as indicated at 314, so the cam hub 316, FIG. 6, may be secured thereto by set screw 318, with a minimum possibility of slippage.

Perforate cam discs 320 and 322 are bolted to the cam hub 316 so the bore of the respective discs 320 and 322 will complementally fit onto the shouldered portion 324 of the cam hub 316. The cam hub 316 has circumferentially spaced holes 326 formed therein, which holes, in the present instance, are shown to be twelve equally spaced holes. The perforate cam discs 320 and 322 each preferably have an equal number of holes, as indicated at 328, which, in the present instance, are shown to be fourteen in number, which holes are equally spaced circumferentially about the same bolt center as the holes 326 which are formed in hub 316. Bolts 330 are adapted to pass through holes 326 and 328 in the cam hub and cam discs, respectively, so as to hold the discs in binding relation on hub 316. By having the number of holes in the perforate discs vary with respect to the number of holes in the hub 316, a Vernier adjusting relation between disc 320 and disc 322 may be had with respect to hub 316, which, in the present instance, gives approximately two degree variation of adjustment to the respective outwardly extending cam pin members 332 and 334. However, more minute adjustments may be had by varying the relative number of holes between the hub and the respective cam discs.

The present device is shown to have six cam hubs thereon, each with perforate cam discs 320 and 322 secured thereto, with outwardly extending cam pin members 332 and 334 rigidly and permanently secured to the respective cam discs for adjustment throughout the circumference of the respective hubs. The composite cam assemblies are designated generally at A, B, C, D, E and F.

The cam assembly A has an outwardly extending pin 334A on the perforate disc thereof, which pin engages a pilot valve actuator member 336 on pilot control valve 338. The pilot control valve 338 is a three-way valve which directs air from air supply line 228A into and through pilot control valve 338, when the valve is opened by cam 334A, air is directed through air line 339 into an end of valve 340, which valve controls air to the motor 302. This will cause a conventional pressure actuated spool element therein (not shown) to shift the valve 340 into closed position, and, at the same time, air is bled from the three-way, pilot control valve 338. With the valve 340 in this position, and with valve 344 open, the programming device is ready to operate.

The motor 302 is initially started by depressing a button 346 on three-way control valve 348, against the tension of a spring, whereupon, air is momentarily directed from air supply line 228B, whereupon, air will flow through manually operated starting valve 348 into air line 350 to move a valve element in motor control valve 340 to open position, then, upon release of button 346, air will be bled from air line 350 and valve 349. Air will then be directed from air supply line 228A through air line 341 and through open valve 340 into air line 341A which leads through open, manually controlled valve 341B and through air line 341C to motor 302. The motor 302 operates in a clockwise direction facing the end of cam shaft 310, which will move outwardly extending cam member 334A until the pilot valve actuator member 336 is disengaged from cam member 334A, whereupon, the motor will continue to rotate shaft 310 in geared relation, so as to cause the cam members 332D to come into engagement with pilot valve actuator member 352, and with the valve 354 open, air will be directed from air supply line 228B through air lines 356, through pilot actuator valve 358 to one end of four-way control valve 226, whereupon, air will be directed from air line 228 into air line 368, through valve 226 into air line 242 to the piston rod end of cylinder 58 to actuate the plunger 54 thereof to perform a power movement of plunger 54 in timed sequence with other fluid actuated cylinders. Air is simultaneously directed into the end of cylinder 110 opposite the piston rod 106 thereof to move the piston rod therein. This position will be maintained until the programming device rotates cam assembly D until cam projection 334D engages pilot valve actuator member 336D. In so doing, air will be directed from air supply line 228A through air line 360, valve 362 into pilot control valve 364, which is a three-way valve with a bleed orifice therein. Air will be directed from air line 366 to the opposite end of valve 226 from air line 356, and since the air pressure from pilot valve 358, upon initially moving valve element in valve 226, bleeds air therefrom, air pressure is exerted on the opposite end of pressure actuating member (not shown) in valve 226, the valve element therein is moved to a position to direct air from air line 228 into air line 368 which leads to and through four-way control valve 226 into air lines 230, 234 and 70 to urge the plunger 54 of cylinder 58 outwardly. Simultaneously, air under pressure will be directed into air line 122 to the end of air cylinder 110 opposite plunger 106 thereof, which will urge plunger 106 outwardly, which plunger is connected, through mechanical elements, to perform a function in sequence with respect to the other functions being performed as the programming device operates.

The cam assembly C will rotate cam projection 332C on cam assembly C mounted on shaft 310, into engagement with pilot actuator valve member 372, which will direct air from air supply line 228B through air supply line 374 to manually operated, three-way, off, on and bleed valve 376, through three-way pilot control valve 370 to four-way, remotely controlled, pressure actuated valve 266 to move a valve element therein (not shown) so as to direct air from air supply line 228, through air line 278 into and through four-way, air control valve 266 to the end of air actuated cylinder 220 opposite the plunger 222 thereof, so as to project the plunger 222 therefrom to perform a mechanical function in sequence in accordance with a programming arrangement of cams on cam shaft 310.

Cam projection 334C may be so positioned as to immediately engage pilot valve actuator lever 380 of pilot actuator valve 382 so as to direct air from air supply line 228 into and through air line 384, through manually operated, off, on and bleed valve 386 into and through three-way, off, on and bleed, pilot actuator valve 382 into air line 388 to an end of four-way, remotely controlled, pressure actuated valve 266 opposite air line 374. This will move a valve element therein (not shown) to direct air into air line 219 to retract plunger 222 in cylinder 220 to perform a mechanical function in programmed sequence to other functions being performed as the cam shaft of the programming device rotates.

As the cam assembly B rotates cam 330B into engagement with pilot valve actuator member 390 on valve 392, air is directed from air supply line 228B through air line 394, into and through off, on and bleed valve 396, into and through pilot valve 392 to one end of three-way, remotely controlled, pressure actuated control valve 244, to move a valve element therein (not shown) so as to direct air from air supply line 228 into air line 186 to the end of the cylinder 184 opposite plunger 182 thereof, and to simultaneously impress pressure through air line 245 on a pressure actuated valve 246 to permit air to escape from the opposite end of the cylinder 184 through air line 188 and through check and restricting flow valve 189 to be vented to atmosphere.

Upon directing air through line 186 into air cylinder 184, the plunger 182 thereof, which has an abutment 181 and support wheels 183 thereon, will extend outward to perform a mechanical function in timed, programmed sequence to the other functions being performed as the cam shaft 310 rotates, with the plunger 182 moving to the outermost point, the cam assembly B moves cam projection 334B into engagement with pilot valve actuator member 397 to cause pilot actuator valve 298, which is a three-way off, on and bleed valve, to open a passage therein to direct air from air supply line 228 into air line 400 to manually operated, off, on and bleed valve 402, through pilot valve 398 into air line 404 to the end of three-way, air actuated control valve 244 opposte air line 394. This will move a valve element (not shown) in valve 244 to a position to close off the air from air supply line 228, and connect a bleed port therein with air line 186, which will release pressure to air actuated valve 246, which valve will be moved by a spring element therein (not shown) to direct air from air supply tank 248 into air line 250 to direct air through remotely controlled, three-way air valve 246 through the restrictions of restricted check and flow valve 189 into the end of cylinder 184 at the end thereof adjacent plunger 182, which will retract abutment 181, which completes the cycle with respect to cylinder 184.

With the above operation completed with respect to cylinder 184 the cam assembly F rotates until the cam projection 332F thereon engages an outwardly extending valve actuator member 406 on pilot actuator valve 408, which is a three-way, off, on and bleed valve, and with the valve open, air is directed from air supply line 228B into air supply line 410 and through manually operated, three-way, off, on and bleed valve 412, into and through pilot valve 408 to an end of four-way, pressure actuated, remotely controlled valve 191 to move a valve element therein (not shown) so as to open a passage therethrough so air is directed from air supply line 228, through air line 414, into air line 192 and into the cylinder 200 on the end of the cylinder opposite the plunger 194 thereof, whereupon, the plunger performs a mechanical operation is timed sequence to the other plungers of the fluid actuated cylinders of the system. The cam assembly F rotates until the cam projection 334F engages actuator arm 314, which engages the projection 334D on cam assembly F, whereupon, air from air supply line 228 is directed into air line 415A into and through manually controlled, three-way, off, on and bleed valve 415B and into air line 415C into the end of four-way, remotely controlled valve 191, opposite the end thereof to which the air line 410 is connected. This will shift a valve element (not shown) within valve 191 to direct air from air line 192 to atmosphere and direct air into air line 202 to retract the plunger 194, which completes a sequence of steps of automation when attached to a machine, with the present programming device.

Various cam projections, prefixed by the numerals 332 and 334, together with the assemblies designated A through F, have been shown on each cam assembly, however, the positioning of these cam projections are not necessarily at the particular location they would occupy in actual operation, as it is possible that two or more operations take place simultaneously, therefore, these projections as shown are for the purposes of illustration, and the location of the projections can be correctly timed and put on a cam shaft assembly, such as shown in FIG. 7, which may be easily inserted into the programming mechanism and removed therefrom by the removal of bearing retainer caps 313. The sequence of timing will not need to be worked out but once, and since the above programming can be so arranged to perform many mechanical functions when the cam assemblies with the cams thereof properly positioned are secured on cam shaft 310 as shown in FIG. 7, however, the entire cam shaft assembly may be readily removed and another preprogrammed cam shaft assembly can be fitted into the programming device to perform other operations, as for instance, the same operation, but in reverse order.

It is to be pointed out that a manually operated three-way, off, on and bleed valve is positioned between each trunk air supply line 228A or 228B and the respective cam actuated pilot control valves. In this manner, any particular operation may be omitted, if this step in a cycle of operations is not needed. Furthermore, the respective three-way, manually operated, by-pass valves 416A, 416B, 416C, 416D, 416E and 416F, 418B, 418C, 418D, 418E and 418F are provided in by-pass relation in the respective air lines leading to the cam actuated pilot valves which are actuated by the various cam projections on cam assemblies A, B, C, D, E and F, thereby to enable any particular operation to be manually performed by manipulation of the particular by-pass valves desired.

Since certain operational functions may not need to be performed in programmed relation it is desirable to remove the cam shaft assembly, designated generally at 309 and to replace same with a similar cam shaft assembly, but with a cam projection thereon programmed to perform different operational functions.

When the normal functions to be performed are desired to be omitted, the air is closed off by closing the manually operated, off, on and bleed valves in the respective air lines leading to the cam actuated pilot valves. With the cam 334 engaging the pilot actuator member 336 to open the air supply line 228 to direct air into and through cam actuated pilot valve 338 which is a three-way, off, on and bleed valve, air will be directed into air line 339 into an end of three-way, air actuated motor control valve 340. Whereupon, a movable valve element in motor control valve 340, (not shown) moves to close the air passage between air supply line 228A and motor control valve 340. Upon moving the valve element within valve 340 to a closed position, the air pressure in air line 339 and in the chamber of valve 340 is bled therefrom, so that the valve will remain in closed position until a manually operated valve actuator or push button 346 is moved to direct air from air supply line 228B through three-way, off, on and bleed valve 348 into air line 350, whereupon, the air is directed into the end of the valve 340 opposite air line 339, which will move a valve element therein (not shown) into a position to open a passage in the valve 340, so the air will be directed from air supply line 228A through air line 341 into an air line 341A into manually operated, four-way valve 341B, which will direct air through conduit 341C into the motor 302 to rotate the motor in one direction, or the air is directed into conduit 341D to rotate the motor in the opposite direction.

Upon depressing valve actuator 346 the motor 302 will rotate cam assembly A, preferably in clockwise position, until the pilot valve actuator member 336 is disengaged from cam projection 334A on cam assembly A, the cam valve actuator assemblies B, C, D and F are rendered inoperative by the manually operated cut-off valves being closed between the air supply lines and the cam actuated pilot valves. This will normally leave cam assemblies A and E operable, whereupon, with the motor 302 rotating, a pilot valve actuator member 420 is engaged by an outwardly projecting cam member 332E, which opens a passage in valve 422 to direct air from air supply line 228B through a manually operated, three-way, off, on and bleed valve 426, through an open passage in valve 422 into air line 428 into an end of pressure actuated, remotely controlled four-way valve 452. This will move a valve element (not shown) to a position to direct air from air supply line 228 into air line 430 and through an open port in valve 452 into air line 254, through three-way switching valve 256 to a diaphragm 258 to actuate a pressure actuated valve 260, which valve is an off, on and bleed valve. This will open a port therein to direct air, under pressure, therethrough, from storage tank 248 to air lines 262 and 264 through valve 260 into air line 174 and into cylinder 164 into the end thereof opposite plunger 160 thereof, which will move the plunger 160 to perform a function in sequence in accordance with the programmed arrangement of the cams on programming device 300.

Upon the cam assembly E continuing to rotate, cam projection 334E will contact pilot valve actuator member 431, whereupon, an air passage in three-way, pilot control valve 432 will be opened to direct air from air supply line 228A into air line 434 and into and through manually operated, three-way, off, on the bleed valve 436, thence through pilot control valve 432 into air line 438 and into the end of four-way, remotely controlled, pressure actuated control valve 252, whereupon, a movable valve element (not shown) in control valve 252 is moved to open a passage in valve 252 so as to direct air from air line 430 into air line 176 into the end of cylinder 164 in which the plunger 160 is located, which will cause plunger 160 to retract, with the air exhausting out through air line 174 to atmosphere, through valve 260, as, when pressure on valve 260 is released, a spring, associated with valve 260, opens a port to direct air from air line 174 to atmosphere.

While one form of programming of the device has been shown and described, it is to be understood that the cams may be rearranged to open and close valves in any desired sequence, either to perform one operation and cease, or to open valves and reinitiate successive operations. The present device is adaptable to various programming operations, where it is desirable to use air actuated mechanisms, such as air cylinders, or air motors to perform various operations. The present device is versatile and is so designed as to operate under adverse conditions, where the use of electricity might not be feasible or would be dangerous, such as for use in meat packing plants in programmed machine operations, on automated oil field drilling rigs, automated operations in foundries or in other fields of endeavor, where it is desirable to remove the possibility of human error in operations which must follow in exact sequence over periods of time and which device is adaptable to be programmed by the mere changing of a cam assembly with another preprogrammed cam assembly. Provision is made to eliminate any station or stations therefore, a programmed cam arrangement with six or more cams may be used to the fullest extent of the cams, or any number of stations desired may be eliminated, either temporarily or permanently by closing off valves, such as valves 412, 426, 354, 376, 396, 415, 436, 362, 386, 402 or 344, which renders a particular pilot control valve or valves inoperative without impairing the effective operation of the remaining programmed cam assemblies.

What is claimed is:
1. An automated programming mechanism, which mechanism comprises;
   (a) a vase,
   (b) a motor associated with said base,
   (c) axially spaced apart shaft bearings mounted on said base,
   (d) a shaft journaled in said bearings,
   (e) a plurality of perforate cam hubs secured to said shaft in spaced apart relation,
       (1) said perforations in said cam hubs being parallel to the axis of said shaft,
       (2) a plurality of perforate cam discs, at least one said cam disc associated with each cam hub, and being coaxial with said shaft,
       (3) the perforations of each said cam disc being parallel to the axis of said shaft, with the perforations in each said cam disc differing from the number of perforations in the corresponding cam hub by at least one,
       (4) an outwardly extending abutment on each said cam disc to form a cam,
       (5) pin-like fastening means passing through at least one aperture in each cam disc and through an aperture in the corresponding cam hub to secure said cam discs to said cam hubs in Vernier, adjusted relation,
       (6) at least one cam actuated pilot control valve associated with said cam having an abutment thereon,
       (7) said motor being connected in driving relation with said shaft,
   (f) air lines providing air under pressure,
   (g) said cam actuating control valves being mounted in fluid communication in said air lines, and
   (h) a plurality of air actuated power means connected in fluid communication in said air lines with said valves for programming operations through a plu- rality of identical cycles, upon successive revolutions of said shaft mounted on said base.

2. An automatic programming device, as defined in claim 1; wherein
(a) said axially spaced apart shaft bearings mounted on said base each having a removable cap thereon, and
(1) fastening means securing each said cap in place to enable the caps to be removed for the removal of the shaft and cams laterally from the bearings without disturbing the relative sequence of the cams on the shaft and to enable replacement of the shaft with cams thereof without disturbing the relative sequence of the timing of said cams.

3. An automatic programming device, as defined in claim 1; wherein
(a) said abutment on each said cam disc is a laterally extending pin permanently secured thereto.

4. An automatic programming device, as defined in claim 1; wherein
(a) each said cam hub has a pair of perforate cam discs fitted thereon, and
(b) said pin-like fastening means are screw threaded bolts which pass through the perforations of each said pair of cam discs and complementary perforations of said cam hub to secure said pairs of cam discs in fixed relation with respect to said respective cam hubs.

5. An automatic programming device, as defined in claim 1; wherein
(a) said cam actuated control valves are pilot control valves, and
(b) remotely controlled valves connected in fluid communication, by said air lines, with said cam actuated pilot control valves.

6. An automatic programming device, as defined in claim 5; wherein
(a) said plurality of air actuated power means, which are connected in fluid communication with said air lines, have remotely control valves therein, which valves are controlled by said cam actuated, pilot control valves.

7. An automatic programming device, as defined in claim 5; wherein
(a) said motor, associated with said base, is an air actuated motor,
(b) a manually operated valve actuator in one of said air lines forms a by-pass through said air line to actuate one of said remotely controlled valves to direct air through an air line connected through said remotely controlled valve to said air motor to actuate said motor.

8. An automatic programming device, as defined in claim 5; wherein
(a) valve means positioned intermediate said air supply line and each said pilot control valve to render said pilot control valve inoperative during the rotation of said cam discs with said cam hub.

9. An automatic programming device, as defined in claim 5; wherein
(a) a control valve is connected in by-pass relation to certain of said pilot valves to enable manual operation of said remotely controlled valve, independently of the rotation of said cam discs.

References Cited
UNITED STATES PATENTS

| | | | |
|---|---|---|---|
| 2,228,700 | 1/1941 | Hamner | 137—624.17 X |
| 2,946,346 | 7/1960 | Mead | 137—624.17 X |
| 3,136,335 | 6/1964 | Beech | 137—624.14 X |

ALAN COHAN, Primary Examiner

U.S. Cl. X.R.

137—624.2